United States Patent [19]

Shiramizu et al.

[11] Patent Number: 4,771,619
[45] Date of Patent: Sep. 20, 1988

[54] STEERING LOCK DEVICE

[75] Inventors: Toshiharu Shiramizu; Nobuyoshi Yasuhara, both of Aichi, Japan

[73] Assignee: Kabushiki Kaisha Tokai Rika Denki Seisakusho, Aichi, Japan

[21] Appl. No.: 71,138

[22] Filed: Jul. 8, 1987

[30] Foreign Application Priority Data

Jul. 14, 1986 [JP] Japan ............... 61-107784[U]

[51] Int. Cl.⁴ .............................................. B60R 25/02
[52] U.S. Cl. ......................................... 70/186; 70/252
[58] Field of Search ............... 70/252, 186, 18, 379 R, 70/380, 360

[56] References Cited

U.S. PATENT DOCUMENTS 4,248,070 2/1981 Eichenauer ................. 70/252
4,276,761 7/1981 Eichenauer ................. 70/252
4,400,954 8/1983 Nakamoto ................... 70/186

FOREIGN PATENT DOCUMENTS 2713381 9/1977 Fed. Rep. of Germany .
2205873 5/1974 France .
2010195 7/1979 United Kingdom .

Primary Examiner—Robert L. Wolfe
Attorney, Agent, or Firm—Finnegan, Henderson, Farabow, Garrett and Dunner

[57] ABSTRACT

A device for locking a steering mechanism which includes a key rotor rotatable and axially movable in a cylinder, a rotatable lock cam coupled to the key rotor to control a lock member adapted to lock and unlock the steering mechanism, a movable regulating plate in the lock cam normally protruding perpendicularly therefrom to prevent the lock cam from turning from an unlock position to a lock position and a drive cam for moving the regulating plate when the key rotor is pushed in so as to allow the lock cam to turn to the lock position.

3 Claims, 3 Drawing Sheets

STEERING LOCK DEVICE

FIELD OF THE INVENTION

This invention relates to a steering lock device, and particularly to such a device in which upon depression of a key in a lock while at the unlock position the key is made rotatable, and upon rotation of the key to the lock position the steering mechanism is locked.

BACKGROUND OF THE INVENTION

In a conventional steering lock device rotation preventing means is provided having a lock cam coupled to a key rotor so that, when the ignition key is turned from the "ON" position to the "ACC" position, the key may not be turned to the "LOCK" position. The key can be turned to the "LOCK" position when depressed at the "ACC" position. When the key is released at the "LOCK" position, then the key can be no longer pushed in; that is, in order to turn the key from the "LOCK" position to the "ACC" position, it is unnecessary to depress the key.

In a conventional steering lock device the means for regulating the rotation of the lock cam, namely, a regulating cam formed by die casting is provided so that it is movable axially with respect to the lock cam. Also, a slide piece for urging the key rotor in a direction opposite to the direction of depression is provided in addition to the regulating cam. Retaining pins are employed to prevent the regulating cam and the slide piece from coming off the lock cam during assembly.

However, such a conventional steering lock device is disadvantageous in that the regulating cam is manufactured by die casting, and it is rather difficult to manufacture. In addition, the regulating cam and the slide piece are returned in a direction opposite to the direction of depression of the key rotor with a plurality of spring and retaining pins. Therefore, such a conventional steering lock device is intricate in construction, requires a large number of components, and is difficult to assemble. Furthermore, since it is necessary to provide a space in the device which allows the regulating cam, the slide piece and the retaining pins to move in the axial direction the distance of the depression of the key rotor, it is necessary to increase the axial length of the steering lock device.

Accordingly, an object of the invention is to provide a steering lock device which is simple in construction, requires a reduced number of components and can be readily assembled, and which can be reduced in its axial length.

SUMMARY OF THE INVENTION

To achieve the foregoing objects and in accordance with the purpose of the invention as broadly described herein, there is provided a steering lock device for attachment to a steering mechanism comprising: (a) a key rotor having a key hole and which is rotable in a cylinder by a key inserted in the key hole and moved axially in the cylinder by pushing the key; (b) a lock cam coupled to said key rotor and rotable therewith to control a lock member adapted to lock and unlock the steering mechanism; (c) a coupling member for coupling said lock cam and said key rotor; (d) a regulating member movably positioned in said lock cam and being normally urged to protrude from the lock cam to prevent the lock cam from turning from an unlock position to a lock position and being movable in the opposite direction from the direction of the protrusion; and (e) a drive cam positioned on the coupling member for moving the regulating member in said opposite direction when said key rotor is pushed in to allow the lock cam to turn to the lock position.

In the steering lock device of the invention, the drive cam is formed on the coupling member to move the regulating member. Therefore, the components are simple in configuration, and it is unnecessary to use the slide piece and the retaining pins. That is, the device is simple in construction and uses a reduced number of components. Therefore it can be readily assembled. Furthermore, the space provided between the key rotor and the lock cam corresponds in length merely to the distance of depression of the key rotor, which makes it possible to reduce the axial length of the device.

BRIEF DESCRIPTION OF THE DRAWINGS

The accompanying drawings, which are incorporated in and constitute a bracket of this specification, illustrate one embodiment of the invention, and, together with the description, serve to explain the principles of the invention. In the drawings.

DESCRIPTION OF A PREFERRED EMBODIMENT OF THE INVENTION

Reference will be made in detail to a preferred embodiment of the invention, an example of which is illustrated in the accompanying drawings.

Figure 1:
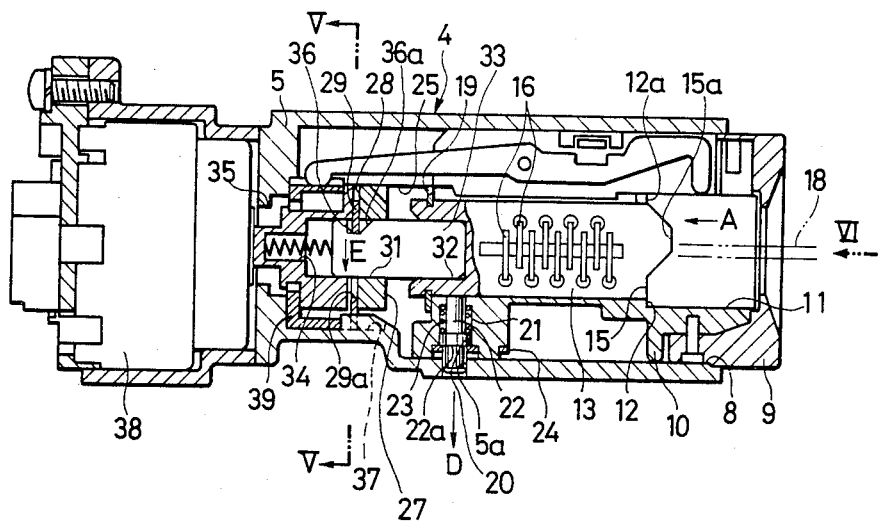
FIG. 1 is a vertical sectional view of one embodiment of the steering lock device in accordance with the present invention.
Figure 2:
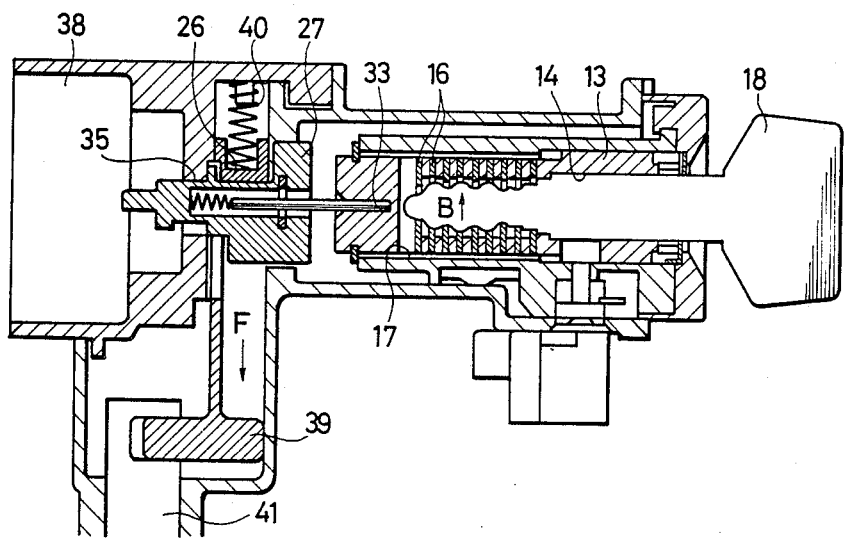
FIG. 2 is a horizontal sectional view of the above embodiment of the steering lock device in accordance with the present invention.
Figure 3:
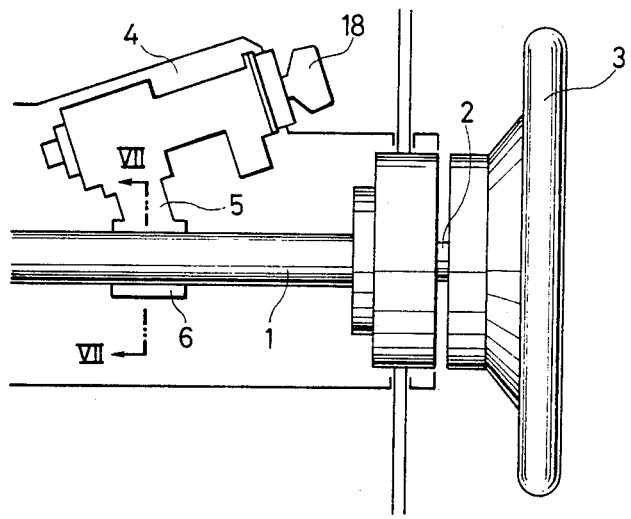
FIG. 3 is a top view, with brackets cut away, outlining the arrangement of the above embodiment.
Figure 7:
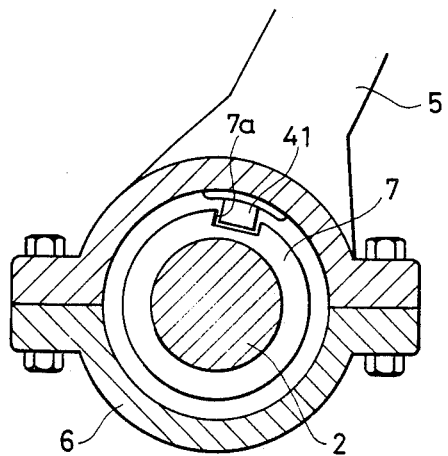
FIG. 7 is a sectional view taken along line VII—VII in FIG. 3.

Referring to FIG. 3, reference numeral 1 designates a steering tube, into which a steering shaft 2 is inserted. A steering wheel 3 is mounted on the upper end portion of the steering shaft 2. Reference numeral 4 designates a steering lock device, the housing 5 of which is secured to the steering tube 1 with a mounting bracket 6. As shown in FIG. 7, lock ring 7 having a lock groove 7a is fixedly mounted on the steering shaft 2, for instance, by welding in such a manner that the lock groove 7a confronts with the housing 5. As shown in FIG. 1, reference numeral 8 designates a cylinder-receiving opening in the right end portion of the housing 5. A key cylinder 9 is inserted into the cylinder receiving opening 8. The key cylinder 9 will be described with reference to FIGS. 1 and 2 in more detail.

In FIGS. 1 and 2, reference numeral 10 designates a cylinder body provided with a rotor-receiving opening 11. The rotor-inserting hole 11 has a step 12 at the middle. A bracket of the step 12 is formed into a protrusion 12a. Reference numeral 13 designates a key rotor arranged in the rotor-receiving opening 11 in such a manner that it is rotatable and axially movable therein. The key rotor 13 has a key hole 14. A step 15 is formed on the key rotor 13. The step 15 has a groove 15a. When the key rotor 13 is held at the "ACC" position or the "LOCK" position, the groove 15a is opposite the protrusion 12a so that the key rotor 13 can be pushed in the direction of the arrow A.

Figure 6:
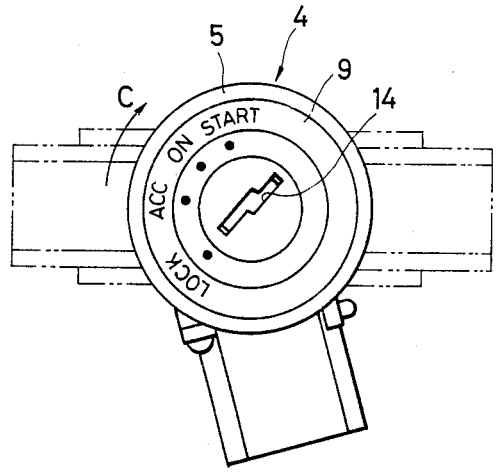
FIG. 6 is a diagram viewed in the direction of the arrow VI in FIG. 1.

Further, in FIGS. 1 and 2, reference numeral 16 designates a plurality of lock plates arranged in the key rotor 13 and urged by coil springs (not shown) in the direction of the arrow B. When the key rotor 13 is held at the "LOCK" position as shown in FIG. 6, the lock plates are engaged with a lock groove 17 in the cylinder body 10 to lock the key rotor 13. Upon insertion of a key 18 into the key hole 14, all the lock plates 16 shown are flush with the outer wall of the key rotor 13 as shown in FIG. 2, so that the key rotor 13 can be turned in the direction of the arrow C as shown in FIG. 6.

Reference numeral 19 designates a stop ring for preventing the removal of the key rotor 13 from the key cylinder 9. Reference numeral 20 designates a through-hole formed in the inner bracket of the cylinder body 10. The through-hole 20 has a step 21 and the flange 22a to urge the stopper pin 22 in the direction of the arrow D, so that the outer end portion of the stopper pin 22 is engaged with a through-hole 5a formed in the housing 5 near the inner end of the cylinder receiving opening 8. Reference numeral 24 designates a retaining plate secured to the open end of the through-hole 20 by caulking, so that the removal of the stopper pin 22 is prevented before the key cylinder 9 is combined with the housing 5.

Reference numeral 25 designates a stepped hole formed in the inner bracket of the cylinder receiving opening 8. A lock cam 27 having a cam surface 26 is rotatably inserted in the stepped hole 25. Reference numeral 28 designates a slit hole perpendicular to the central axis of the lock cam 27. A regulating member, namely, a regulating plate 29 is slidably placed in the slit hole 28, and is urged by the coil spring 30 in the direction of the arrow E. Reference numeral 31 designates a rectangular coupling hole which is extended along the central axis of the lock cam 27 and communicated with the slit hole 28. Reference numeral 32 designates a rectangular coupling hole formed in the key rotor 13 in such a manner that it is opposite the aforementioned coupling hole 31. Reference numeral 33 designates a flat-plate-shaped coupling member having one end portion fitted in the coupling hole 32 and the other end portion slidably inserted into the coupling hole 31. The other end portion of the coupling member 33 penetrates the through-hole 29a formed in the regulating plate 29. A recess 34 is formed in the inner bracket of the coupling hole 31. A coil spring 35 is provided in the recess 34 to urge the coupling member 33 and the key rotor 13 in the direction opposite to the direction of the arrow A. As is apparent from the above description, rotation of the key rotor 13 is transmitted through the coupling member 33 to the lock cam 27.

Further in the accompanying drawings, reference numeral 36 designates a drive cam formed by cutting one end portion of the coupling member 33. The drive cam 36 has a sloped surface 36a on the side of the key rotor 13. When the key rotor 13 is not yet pushed in as shown in FIG. 1, the through-hole 29a of the regulating plate 29 is coincident in position with the drive cam 36. A recess 37 is formed in the wall of the stepped hole 25 in such a manner as to confront with the end of a lock member 39. When the key rotor 13 is set at the unlock position, i.e., the "ACC", "ON" or "START" position, the end portion of the regulating plate is protruded out of the lock cam 27 by the elastic force of the coil spring 30, thus engaging with the recess 37.

In FIGS. 1 and 2, reference numeral 38 designates an ignition switch operated through the lock cam 27, 39. A locking element 39 forms the aforementioned lock member and is driven by the cam surface 26 of the lock cam 27, 40. A coil spring 40 is provided for urging the locking element 39 in the direction of the arrow F, and a lock bar 41 forms the lock member and is coupled to the locking element 39.

The operation of the embodiment thus constructed will be described. As the key 18 is turned in the direction of the arrow C from the "ACC" position to the "ON" position and the "START" position in FIG. 6, the key rotor 13, the coupling member 33 and the lock cam 27 are turned in the same direction, and the state of the ignition switch 38 is changed. When the key is at the "ON" or "START" position, the locking element 39 is placed on the cam surface 26 of the lock cam 27, thus being displaced in the direction opposite to the direction of the arrow F, while the end portion of the lock bar 41 is disengaged from the lock ring 7, as a result of which the steering shaft 2 is unlocked. When under this condition the key 18 is released at the "START" position, the key 18 is automatically returned to the "ON" position.

Even if, after the key 18 is turned to the "ACC", it is tried to turn the key to the "LOCK" position, it is impossible to do so because the end portion of the regulating plate 29 is abutted against the end face of the recess 37.

Figure 4:
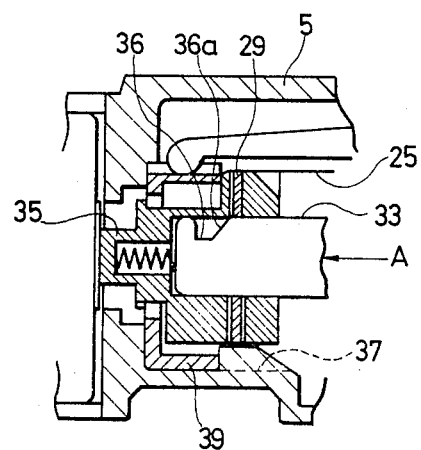
FIG. 4 is a vertical sectional view showing a variation of the embodiment shown in FIG. 1.

When the key 18 is turned to the "ACC" position, the groove 15a in the outer wall of the key rotor 13 aligns with the protrusion 12a, and therefore the key rotor 13 can be slid in the direction of the arrow A with the key 18. At the same time, the coupling member 33 is slid in the direction of the arrow A as shown in FIG. 4. Therefore, the regulating plate 29, being guided by the sloped surface 36a of the drive cam 36, is moved in the direction opposite to the direction of the arrow E against the elastic force of the coil spring 30. As a result, the end portion of the regulating plate 29 is disengaged from the recess 37, thus becoming flush with the wall of the lock cam 27. Therefore, the lock cam 27 can turn in the direction opposite to the direction of the arrow C.

Figure 5:
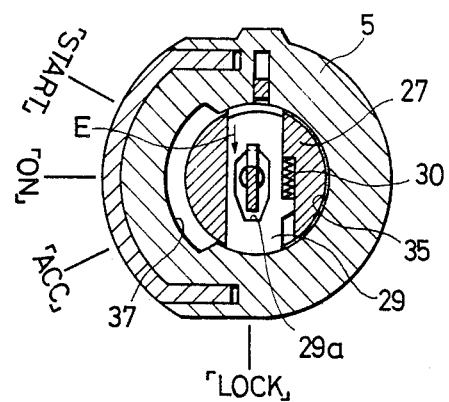
FIG. 5 is a sectional view taken along line V—V in FIG. 1.

Accordingly, when the key 18 is pushed in it can be turned in the direction opposite to the direction of the arrow C, to the "LOCK" position. When the key 18 is released at the "LOCK" position, the coupling member 33 and the key rotor 13 are restored by the elastic force of the coil spring 35 as shown in FIG. 1. When the key 18 is held at the "LOCK" position, the end portion of the regulating plate 29 is abutted against the wall of the stepped hole 25 by the elastic force of the coil spring 30 (cf. FIG. 5).

When the lock cam 27 is thus held at the lock position, the locking element 39 is disengaged from the cam surface 26 of the lock cam. Therefore, upon removal of the key 18 from the key hole 14, the locking element 39 is moved in the direction of the arrow F by the elastic force of the coil spring 40. When the lock groove 7a of the lock ring 7 is aligned with the end portion of the lock bar 41 by rotation of the steering wheel 3, the lock groove 7a is engaged with the end portion of the lock bar 41, so that the steering shaft 2 and, accordingly, the steering wheel 3 is locked. Therefore, the rotation of the steering wheel 3 is prevented. When the key 18 is at the "LOCK" position and is removed from the key hole 14, the lock plates 16 are caused to remain in the lock groove 17 to prevent the rotation of the key rotor 13.

When the key 18 is inserted into the key hole 14 of the key rotor 13 which is at the "LOCK" position, the ends of the lock plates 16 become flush with the cylindrical wall of the key rotor 13 so that the latter 13 can rotate. When, under this condition, the key 18 is turned in the direction of the arrow C to the "ACC" position, the lock cam 27 is set at the unlock position through the coupling member 33. Therefore, the locking element 39 is placed on the cam surface 26 of the lock cam 27, and the locking element 39, together with the lock bar 41, is displaced in the direction opposite to the direction of the arrow F against the elastic force of the coil spring 40. As a result, the end portion of the lock bar 41 is disengaged from the lock groove 7a of the lock ring 7, so that the steering shaft 2 is released from locking.

When, on the other hand, the key 18 is turned to the "ACC" position as described above, the end portion of the regulating plate 29 is also turned to engage with the recess 37 in the housing 5, so that rotation of the key 18 to the "LOCK" position is prevented.

In the steering lock device of the invention, the coupling member 33 has formed on it the drive cam 36, which is used to move the regulating plate 29. The coupling member 33 and the regulating plate 29 are each simple in configuration, or flatplate shaped. Furthermore, in the device of the invention, it is unnecessary to use components corresponding to the slide piece and the pin, which are intricate in configuration, in the conventional steering lock device. Also, the number of coil springs used is less than in the conventional device. Thus, the steering lock device of the invention is simple in construction, and the number of components is reduced. Therefore it can be readily assembled.

Furthermore, in the device of the present invention, the regulating plate 29 is displaced in the direction perpendicular to the axis of the lock cam 27. This arrangement makes it possible to eliminate the portion of the axial length required for axial movement of the regulating cam and the slide piece in the conventional device. That is, the space provided between the key rotor 13 and the lock cam 27 corresponds in length to the movement of the key rotor 13, with the result that the device can be decreased in axial length.

Having described an embodiment of the present invention, it is apparent that various modifications and variations may be made in the steering lock device without debracketing from the spirit or scope of the appended claims.

What is claimed is:

1. A steering lock device for attachment to a steering mechanism comprising:
   (a) a key rotor having a key hole and which is rotable in a cylinder by a key inserted in the key hole and moved axially in the cylinder by pushing the key;
   (b) a lock cam coupled to said key rotor and rotable therewith to control a lock member adapted to lock and unlock the steering mechanism;
   (c) a coupling member for coupling said lock cam and said key rotor;
   (d) a regulating member movably positioned in said lock cam and being normally urged to protrude from said lock cam so as to prevent said lock cam from turning from an unlock position to a lock position, and being movable in the opposite direction from the direction of said protrusion; and
   (e) a drive cam positioned on said coupling member for moving said regulating member in said opposite direction when said key rotor is pushed in so as to allow said lock cam to turn to the lock position.

2. The device according to claim 1, wherein said regulating member is a plate moveable in the direction perpendicular to the axis of said lock cam.

3. The device according to claim 2, further including a spring for urging said plate to protrude from said lock cam.

* * * * *